United States Patent [19]

Lee

[11] 4,176,259
[45] Nov. 27, 1979

[54] READ APPARATUS

[75] Inventor: Ernest P. Lee, Acton, Mass.

[73] Assignee: Honeywell Information Systems, Inc., Waltham, Mass.

[21] Appl. No.: 729,336

[22] Filed: Oct. 4, 1976

[51] Int. Cl.² .......................... G06K 7/08; G06K 7/10; G11B 5/09

[52] U.S. Cl. .................................. 235/449; 235/466; 360/44

[58] Field of Search ................ 235/61.11 D, 61.11 E, 235/61.7 B, 61.12 M, 61.12 N, 466, 449; 340/149 A, 146.3 Z, 146.1 R; 250/568, 569; 360/88, 42, 44

[56] References Cited

U.S. PATENT DOCUMENTS

| | | | |
|---|---|---|---|
| 3,341,691 | 9/1967 | Modersohn | 235/61.11 E |
| 3,720,927 | 3/1973 | Wolf | 360/44 |
| 3,727,202 | 4/1973 | Fort | 360/42 |
| 3,784,792 | 1/1974 | Dobras | 235/61.11 E |
| 3,806,706 | 4/1974 | Hasslinger | 235/61.11 E |
| 3,882,301 | 5/1975 | Nassimbene | 235/61.11 E |
| 3,898,689 | 8/1975 | D'Orazio | 235/466 |
| 3,932,731 | 1/1976 | Moore | 235/449 |
| 3,949,394 | 4/1976 | Kennedy | 235/449 |
| 3,959,625 | 5/1976 | Kashio | 235/61.11 E |
| 4,079,240 | 3/1978 | Rynkowski | 235/466 |

Primary Examiner—Robert M. Kilgore
Attorney, Agent, or Firm—Finnegan, Henderson, Farabow & Garrett

[57] ABSTRACT

Apparatus for processing bits of information magnetically recorded on a credit card or similar article. The apparatus includes a slot for receiving the credit card as well as a transducer for reading the bits of information when the card is manually moved thereunder. Circuitry connected to the transducer is operative to read the recorded bits of information. Sensors, provided at each side of the transducer, detect and time the initial movement of the card. An alarm circuit is operative to generate a warning if the card does not proceed at the minimum speed necessary to read the bits of information.

21 Claims, 7 Drawing Figures

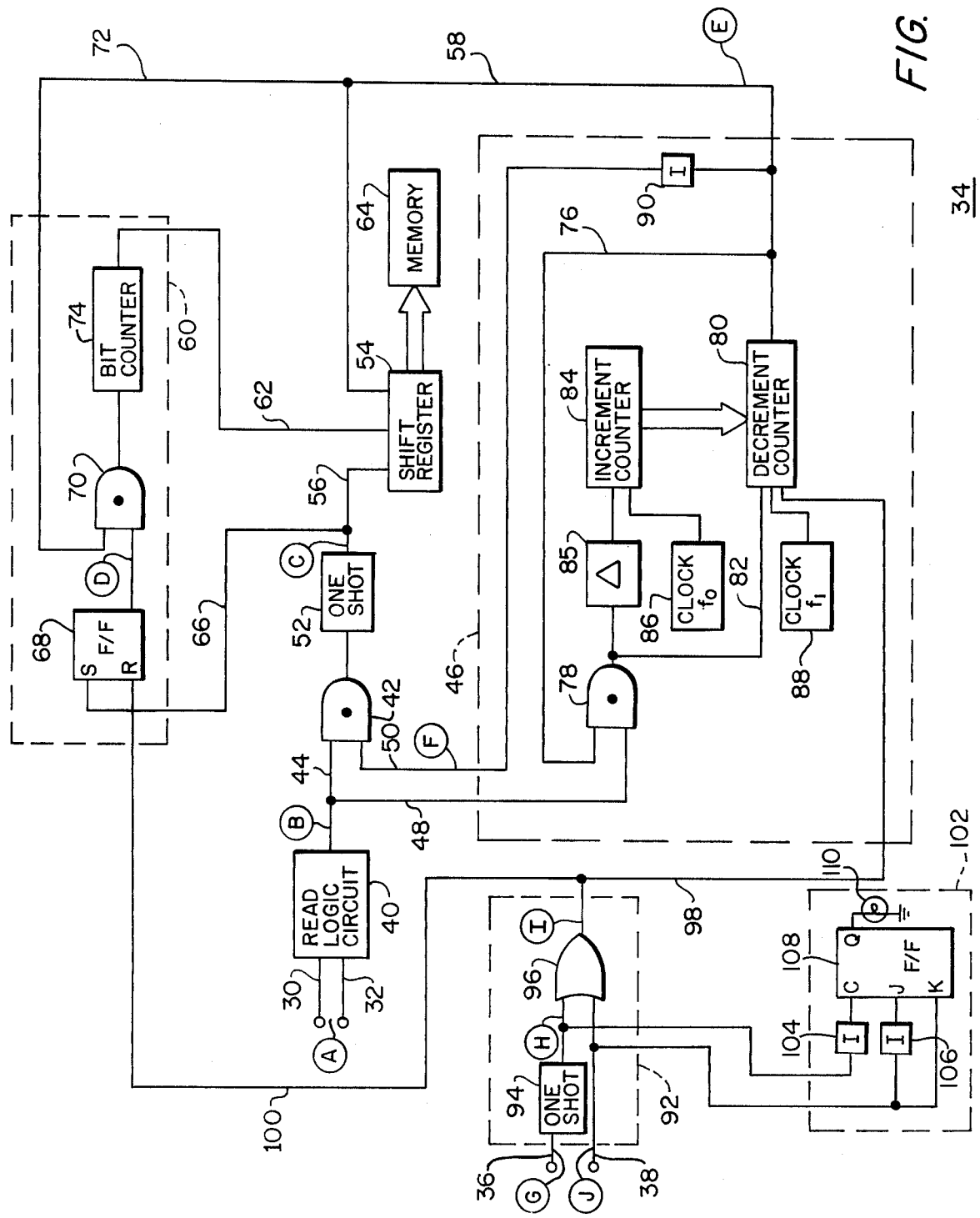

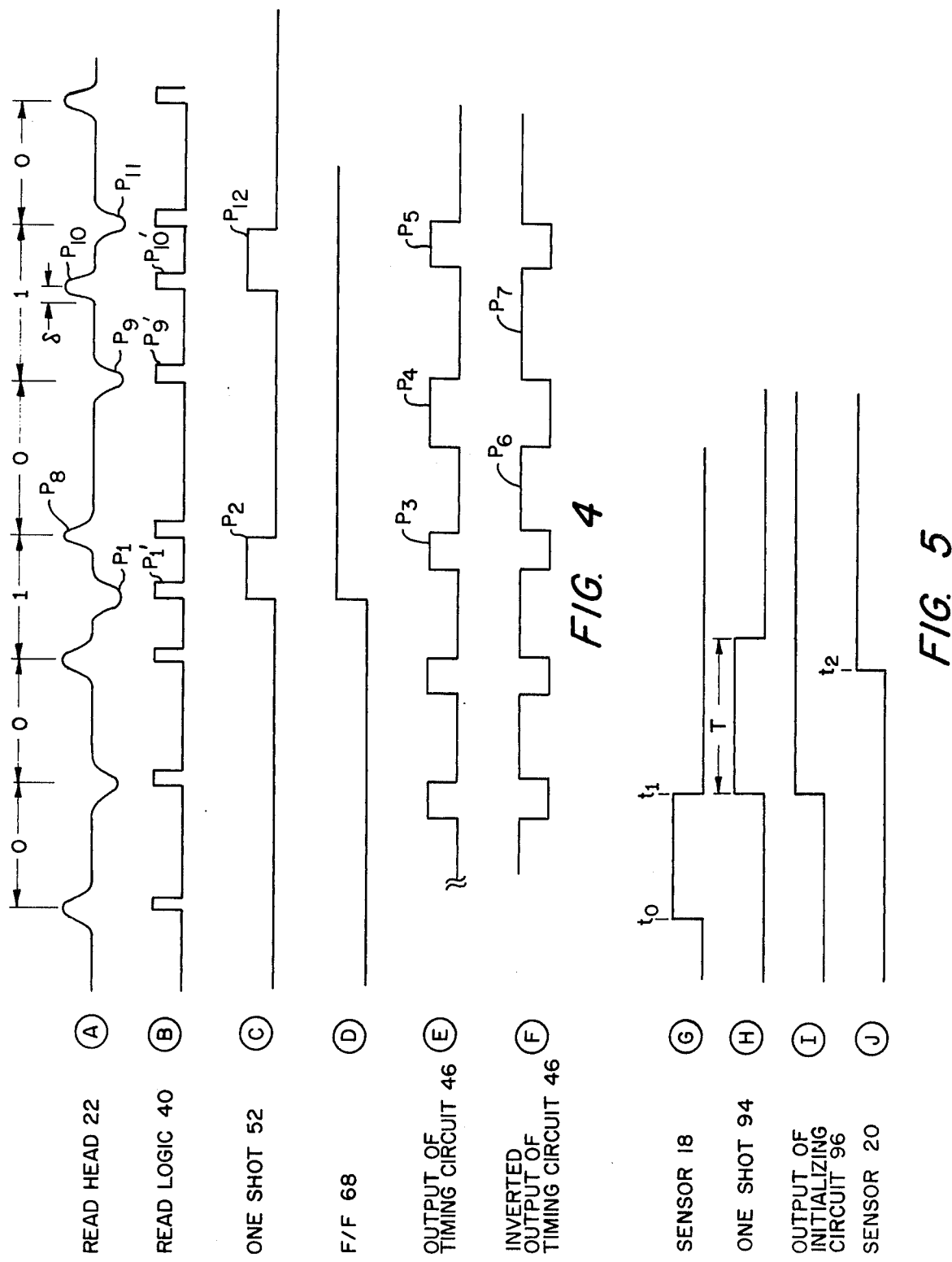

READ APPARATUS

BACKGROUND OF THE INVENTION

1. Field of the Invention

This invention relates generally to the reading of non-legible information appearing on a credit card or similar article. In particular, this invention relates to the reading and processing of non-legible information appearing in the form of magnetic recordings on a credit card or similar article.

2. Description of the Prior Art

The processing of non-legible information appearing on articles such as personalized cards in the hands of the general public has been continually expanding in the recent past. This non-legible information has usually taken the form of either an optical bar encoding or a magnetic recording. In either instance, the non-legible information is in a form that can be detected by appropriate data processing equipment. While both forms of non-legible information are in use, it is to be appreciated that the magnetically recorded form results in a significantly increased recording density. This is quite important when one realizes that the non-legible information is usually confined to a relatively small area on the card.

There are basically two ways of reading magnetically recorded information appearing on a card or similar article. One way is to move the card relative to a magnetic head so as to cause the magnetic field to vary underneath the head. Another way is to maintain the card in a stationary position and move the magnetic head relative thereto so as to create a varying magnetic field underneath the read head. In either instance, it is common practice to initiate the relative movement by a motorized means which is often part of an overall servo control. This type of controlled motion provides for a constant relative movement that can be relied upon in reading the recorded information. While this increases the accuracy of reading the recorded information, the same is nonetheless accomplished at great expense. In this regard, the provision of a small motorized means which is subject to servo control can result in elaborate electrical circuitry and mechanical parts.

Attempts have been made to eliminate the need for a constant relative movement. These attempts have often lead to elaborate circuitry to compensate for any variation in speed experienced in the relative movement between the card and the magnetic head.

OBJECTS OF THE INVENTION

Accordingly, it is a general object of this invention to provide new and improved apparatus for reading recorded information on a credit card or similar article.

A particular object of this invention is to provide a new and improved apparatus for reading magnetically recorded information that is moving at a variable speed relative to the magnetic head.

Still another object of this invention is to provide apparatus for reading magnetically recorded information wherein the apparatus comprises relatively few moving parts and a relatively small amount of electrical circuitry.

A still further object of the invention is to provide a method of extracting magnetically recorded information from a magnetic media that is being moved at a variable speed past a magnetic read head.

SUMMARY OF THE INVENTION

The above objects are achieved according to the present invention by providing an apparatus which is capable of processing previously recorded magnetic information while the medium on which the information is recorded is moved manually. In the preferred embodiment, this apparatus consists of a device for receiving a credit card or similar article containing magnetically recorded information. The device allows for the initial positioning of the card relative to a magnetic head stationed therein. The device furthermore accommodates the manual movement of the card relative to the magnetic head.

Circuitry attached to the magnetic head detects the recorded information as it passes underneath the magnetic head. This circuitry identifies each bit of information and segregates these bits into characters. This occurs even though the recorded information is moving underneath the magnetic head at other than a uniform speed. Provision is made for monitoring the start-up speed of the card so as to guarantee that the card is moving at a sufficient speed to detect the recorded information.

BRIEF DESCRIPTION OF THE DRAWINGS

For a better understanding of the present invention, reference should be made to the accompanying drawings wherein:

FIG. 3 illustrates the logic for processing the magnetically recorded information appearing on the magnetic media of the credit card in FIG. 1;

FIGS. 4 and 5, consisting of A–J, illustrate certain waveforms occurring within the logic of FIG. 3;

DESCRIPTION OF THE PREFERRED EMBODIMENT

Figure 1:
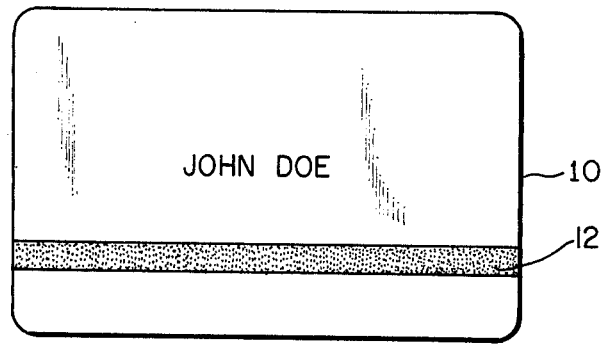
FIG. 1 illustrates a credit card with a magnetic media embossed thereon.

Referring to FIG. 1, a credit card 10 is illustrated with both legible and non-legible information appearing thereon. The non-legible information is contained within a magnetic strip 12 extending across the face of the credit card 10. The magnetic strip 12 contains a magnetic recording consisting of a series of flux reversals that have been recorded according to a particular digital coding standard such as for example the American Banking Association or the International Air Traffic Association. The information which has been recorded can include account numbers, expiration dates and other information pertinent to the particular card holder indicated on the face of the card.

It is to be appreciated that while a credit card is illustrated in FIG. 1, the scope of the present invention is with respect to the processing of information on the magnetic strip 12. In this regard, the magnetic strip could appear on any sort of a suitable article which is to be processed.

Figure 2:
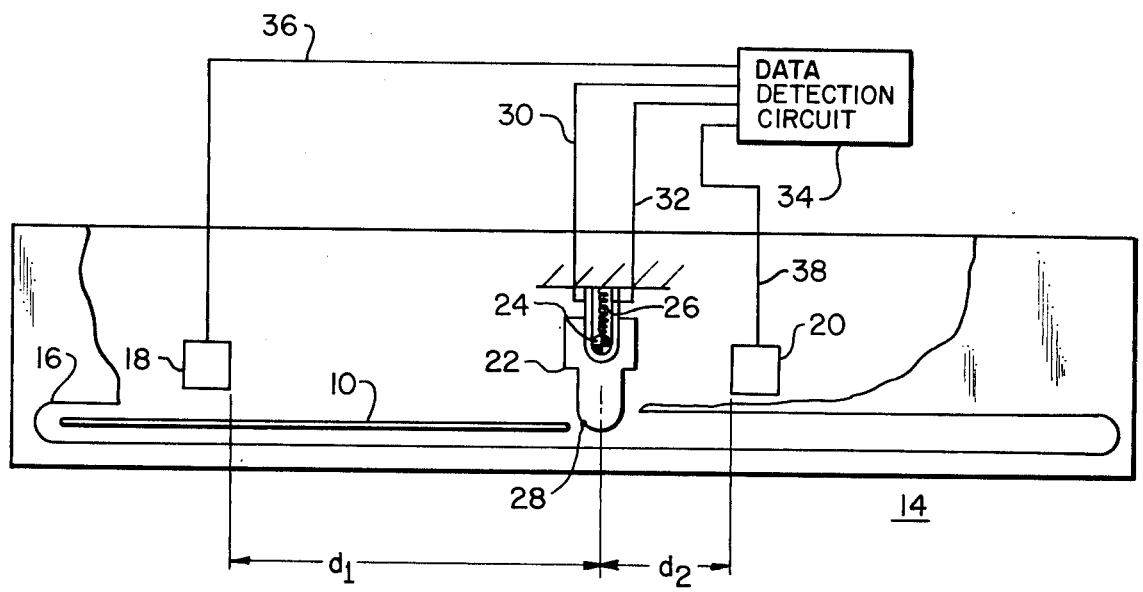
FIG. 2 depicts the apparatus for manually processing the credit card of FIG. 1.

Referring now to FIG. 2, a read apparatus 14 is illustrated with a slot 16 for receiving the credit card 10. It is to be understood that the width of the credit card 10 is not entirely inserted into the slot 16. In other words, an appreciable portion of the credit card 10 remains outside of the slot 16 so as to allow for fingertip control.

The read apparatus 14 has been cut away so as to illustrate a pair of sensors 18 and 20 positioned above the slot 16. The sensors 18 and 20 are positioned to either side of a magnetic read head 22. The sensors 18 and 20 are spaced from the read head 22 in such a manner as to detect the initial movement of the credit card 10. In this regard, the sensor 18 is spaced a distance "$d_1$" from the center of the read head 22. The distance "$d_1$" is less than the total length of the credit card 10. This spaced distance allows the sensor 18 to detect an important position of the credit card 10 relative to the read head 22. Specifically, the spacing $d_1$ allows the sensor 18 to detect when the leading edge of the credit card 10 has passed underneath the read head 22. The trailing edge of the credit card 10 will no longer be underneath the sensor 18 at this time thereby having caused the sensor 18 to trigger. Also, by this time, the read head 22 will have experienced any electrical noise environment caused by its initial engagement with the credit card 10. The read head is also now in a position for detecting recorded information on the magnetic strip 12. In this regard, the spacing $d_1$ is such as to place a forwardmost area of the credit card 10 underneath the read head 22. As will be discussed hereinafter, this forwardmost area contains certain encoded information which is used to initialize the detection of recorded data. The distance $d_1$ is such as to center the read head 22 over this encoded information.

The sensor 20 is spaced a distance $d_2$ from the center of the read head 22. The sensor 20 will trigger only after the credit card 10 has proceeded past the center of the read head 22 for the distance $d_2$. As will be illustrated hereinafter, this is utilized to check the speed at which the credit card 10 has proceeded underneath the read head 22.

The magnetic read head 22 is pivotally mounted on a spring-biased axis 24 which moves within a channel 26. This allows the magnetic read head to adjust to the manual movement of the credit card 10 thereunder. It is also to be noted that the bottom of the magnetic read head 22 consists of a rounded contour 28 in the direction of movement so as to allow the credit card 10 to move underneath the read head 22. The rounded contour 28 does not exist in the width-wise direction of the credit card 10. In this regard, the contour of the magnetic read head 22 assures that the credit card 10 will be initially loaded as shown in FIG. 2.

The magnetic read head 22 is electrically connected through a pair of lines 30 and 32 to a data detection circuit 34. The sensors 18 and 20 are electrically connected through wiring 36 and 38 to the same data detection circuit 34.

Referring now to FIG. 3, the data detection circuit 34 of FIG. 2 is illustrated in detail. It will be remembered that the data detection circuit 34 receives the signal from the magnetic read head 22 via a pair of lines 30 and 32. The lines 30 and 32 are seen to be connected to a read logic circuit 40. The read logic circuit 40 develops a pulse for each magnetic flux reversal which is sensed by the magnetic read head 22. This is illustrated by the waveforms A and B of FIG. 4 which depict the input and output signal conditions for the read logic circuit 40. The waveform A is seen to consist of a series of positive and negative going pulses corresponding to the sensing of magnetic flux reversals by the read head 22. It is to be understood that these flux reversals have been previously recorded on the magnetic media 12 according to a particular binary encoding scheme. The coding scheme used in the preferred embodiment dictates that a magnetic flux reversal occur at the beginning of each bit cell period. This flux reversal is followed by a second magnetic flux reversal during the bit cell period when a binary one is to be recorded. The absence of a magnetic flux reversal during the bit cell period indicates that a binary zero has been recorded. The waveform A of FIG. 4 illustrates the read out signal from a magnetic head when such a binary encoding scheme is used. In this regard, each positive or negative pulse within the waveform A represents the sensing of a particular magnetic flux reversal.

The waveform B in FIG. 4 illustrates the development of uniformly squared pulses by the read logic 40 in response to the pulses of waveform A. It is to be noted that a uniformly squared pulse occurs in the waveform B for each and every pulse of the waveform A. The development of the pulses in waveform B will be more fully discussed hereinafter.

Referring now to FIG. 3, the output of the read logic circuit 40 is applied to an AND-gate 42 via a line 44. The output of the read logic circuit 40 is also applied to a timing circuit 46 via a line 48. The timing circuit 46 is operative to generate a signal on a line 50 which disables the AND-gate 42 whenever a pulse indicating the beginning of a bit cell period occurs on the line 44. The AND-gate 42 is otherwise enabled during the course of a bit cell period for receipt of a possible data pulse indicating a binary one. When such a data pulse occurs, the AND-gate 42 goes high thereby triggering a one-shot 52.

The one-shot 52 is connected to a shift register 54 via a line 56. The output signal level of the one-shot 52 will be logically high when the one-shot 52 has been triggered by the leading edge of a gated data pulse from the AND-gate 42. In the preferred embodiment, the one-shot is edge triggered on the positive going transition of the gated data pulse. The output signal level will be low when the one-shot 52 has not been triggered. In either case, the one-shot 52 will eventually provide a signal level to the shift register 54 indicative of the binary value of the bit cell currently being processed. The binary value will be initially stored in the first bit cell of the shift register 54. The binary value of the bit of information appearing in the first bit cell of the shift register 54 will be subsequently shifted within the shift register 54 by a signal from the timing circuit 46 via a line 58. This process of storing and shifting will continue to occur until the shift register 54 has stored a complete character of information. At this time, a signal from a character recognition circuit 60 via a line 62 parallel loads the bit contents from the shift register 54 into a memory 64.

The character recognition circuit 60 is operative to maintain a count of the number of bits necessary to form a data character. In order to initially do this, the character recognition circuit 60 detects the occurrence of the first bit of the first data character. This is made possible by prearranging that the first bit of the first character is also the first binary one to occur on the magnetic media 12. This first occurring binary one causes the one-shot 52 of FIG. 3 to go logically high thereby producing a logically high signal on a line 66. The logically high signal on the line 66 sets a flip-flop 68 logically high within the character recognition circuit 60. The flip-flop 68 in turn enables an AND-gate 70 within the character recognition circuit 60. The AND-gate 70 also receives a timing signal from the timing circuit 46 via a line 72. As will be explained in detail hereinafter, the timing circuit 46 produces a pulse at the end of each bit cell period. This pulse appears on the line 72 and is subsequently gated through the enabled AND-gate 70. The gated pulse is applied to a bit counter 74 which maintains a count of the number of bit cells which have thus occurred. This continues to occur until the bit counter 74 reaches a predetermined bit count. At this time, the bit counter 74 goes logically high thereby generating a logically high signal to the shift register 54 via a line 62. This logically high signal on the line 62 causes the shift register 54 to parallel load the bit contents into a memory 64.

Waveforms A through E of FIG. 4 illustrate the above operation of the character recognition circuit 60. In particular, waveform A, representing the output signal of the read head 22, begins with two zero bits followed by a one bit. The two zero bits merely represent the last of a continuous string of zero bits which are first recorded on the forwardmost area of the credit card 10. These bits are the first bits of information to be detected by the data detection circuit 34 when the card 10 is properly underneath the read head 22. The bit sequence of waveform A results in the pulses of waveform B which fail to initially trigger the one-shot 52 as represented by the waveform C. In this regard, it will be remembered that the AND-gate 42 is disabled at the beginning of each bit cell period thereby not allowing the pulses occurring at these times to be applied to the one-shot 52. On the other hand, the AND-gate 42 is not disabled when the data pulse $P_1$ occurs during the first binary one bit cell in the waveform A. This results in the corresponding pulse $P_1'$ in the waveform B being applied to the one-shot 52 which produces the pulse $P_2$ in the waveform C. The pulse $P_2$ sets the flip-flop 68 logically high as is indicated by the transition of waveform D from a logically low level to a logically high level. This enables the AND-gate 70 which in turn permits the pulses from the timing circuit 46 to be applied to the bit counter 74. Hence, the timing pulses $P_3$ through $P_5$ of waveform E are applied to the bit counter 74. In this manner, a bit count is begun when the pulse $P_3$ occurs at the end of the first binary one bit cell. This bit count continues until a full complement of bits evidencing a complete character has been stored in the shift register 54. The bit counter thereafter goes high causing the bit contents within the shift register 54 to be parallel loaded into the memory 64.

The pulses $P_3$ through $P_5$ appearing in the waveform E are generated at the output of the timing circuit 46. These pulses are also internally fed back via a line 76 to an AND-gate 78 within the timing circuit 46. The AND gate 78 also receives the train of pulses of waveform B from the read logic circuit 40 via the line 48. The pulses on the feedback line 76 selectively enable the AND-gate 78 so as to gate certain of the pulses on the line 48. In particular, the only pulses which are selectively gated through the AND-gate 78 are those denoting the ending of bit cell periods. This is illustrated in FIG. 4 wherein each pulse in the waveform B occurring at the end of a bit cell period is matched with a pulse in the waveform E. This simultaneous occurrence of pulses allows the pulse in the waveform B to be selectively gated.

The gated pulse from the AND-gate 78 indicating the end of a bit cell period is directly applied to a decrement counter 80 via a line 82. The gated pulse from the AND-gate 78 is also applied to an increment counter 84 after having been delayed by a delay 85. The decrement counter 80 is operative to parallel load the count from the increment counter 84 in response to the pulse appearing on the line 82. The increment counter 84 is shortly thereafter set to zero by the same pulse which has been delayed by the delay 85. It is to be noted that the delay by the delay 85 allows just enough time for the parallel load to occur. In this regard, the relative counts of both counters are not appreciably affected by this small delay.

The zero count in the increment counter 84 is subsequently incremented upwardly by a clock 86 having a frequency $f_0$. The count which has been previously loaded into the decrement counter 80 from the increment counter 84 is subsequently decremented downwardly by a clock 88 having a frequency $f_1$. The clocking frequencies $f_1$ and $f_0$ are preferably set at a ratio of $f_1:f_0=4:3$. In other words, the frequency $f_1$ is thirty-three percent higher than that of the frequency $f_0$. This difference in clocking frequencies permits the decrement counter 80 to reduce the count therein to zero at a more rapid rate. Specifically, the count that has been previously stored therein will be clocked to zero within seventy-five percent of the time taken by the increment counter 84 in originally arriving at the particular count. The output of the decrement counter 80 will go logically high when the count therein has thus been clocked to zero. This produces one of the pulses $P_3$ through $P_5$ at the output of the timing circuit 46. While pulses $P_3$ through $P_5$ are initially formed as a result of a decrement counter 80 having reached a zero count, these same pulses are terminated only after the decrement counter 80 is reset by the leading edge of a gated pulse appearing on the line 82 indicative of the end of the bit cell period. The trailing edge of each of the pulses $P_3$ through $P_5$ occurs after short propagation and response delays. In this manner, the trailing edge of each of the pulses $P_3$ through $P_5$ denotes the end of a particular bit cell period.

The beginning of the next bit cell period for the purpose of detecting data is marked by the pulses $P_6$ and $P_7$ in the waveform F of FIG. 4. These pulses are denoted as the inverted output of the timing circuit 46. The pulses actually result from inverting the output of the decrement counter 80 through an inverter 90 in FIG. 3. These pulses are applied to the AND-gate 42 via the line 50 and are operative to selectively enable the AND-gate 42 during those portions of a bit cell period wherein a data pulse may occur indicative of a binary one. In this regard, the pulses $P_6$ and $P_7$ are logically high for a considerable portion of each bit cell period. These pulses are actually high for three-quarters of the previous bit cell period. This is the time taken by the decrement counter 80 to decrement the count of the previous bit cell period to zero.

From the foregoing, it is to be appreciated that the leading edges of the timing pulses, i.e. $P_6$ and $P_7$ denote the beginnings of bit cell periods for purposes of detecting data. It is to be moreover appreciated that the ending of bit cell periods are denoted by the trailing edges of the timing pulses $P_3$ through $P_5$. In this manner, a bit cell period is defined for instance by the leading edge of pulse $P_6$ and the trailing edge of pulse $P_4$.

The distance between the leading edge of the pulse $P_6$ and the trailing edge of the pulse $P_4$ is dependent on the speed of the credit card 10 during the particular bit cell period which is thereby defined. It has been determined that this speed will range from a low of three inches per second to a high of ten inches per second. This speed range will of course produce a corresponding wide range of elapsed times for the bit cell time period. The counter 84 must be capable of counting to a sufficiently high count within the range of elapsed times for a bit cell period. This is accomplished by selecting a sufficiently high clocking frequency $f_0$ so as to allow the clock 86 to produce a large number of clock pulses during the minimum bit period. It has been determined that magnetic media having a bit cell density of two hundred and ten bits per inch and traveling at a maximum rate of ten inches per second, will require a clocking frequency $f_0$ of $1.6 \times 10^5$ Hz. This frequency will produce a minimum of seventy-six pulses per bit cell period. The same magnetic media 12 having a bit cell density of seventy-five bits per inch and traveling at the rate of three inches per second will produce a maximum of two hundred fifty-three pulses per bit cell period. In order to accommodate the maximum and minimum pulses per bit cell period, the capacity of the counters 80 and 84 was selected to be two hundred fifty-six bits.

An example of the timing circuit 46 adjusting for variations in bit cell periods is clearly illustrated in FIG. 4 wherein the fourth complete bit cell marked by the pulses $P_8$ and $P_9$ in the waveform A is twenty-five percent longer than each of the three previously occurring bit cell periods. The timing circuit internally compensates for the additional time of this bit cell period by simply maintaining the pulse $P_4$ until such time as the pulse $P_9$ occurs in the waveform A. This is illustrated in the waveform E of FIG. 4 wherein the trailing edge of the pulse $P_4$ does not occur until the pulse $P_9'$ of waveform B.

It is to be appreciated that the timing circuit 46 can also compensate for a variance of the data pulse within a bit cell period. This is illustrated by the fifth bit cell marked by the pulses $P_9$, $P_{10}$ and $P_{11}$ in the waveform A of FIG. 4. Specifically, the pulse $P_{10}$ indicative of a binary one value does not occur until a time $\delta$ after the mid-cell position. It is to be noted that the pulse $P_7$ in the waveform F remains logically high during this time. This assures that the belatedly occurring pulse $P_{10}'$ in the waveform B is gated by the AND-gate 42. The gated pulse $P_{10}'$ will trigger the one-shot 52 thereby producing the pulse $P_{12}$ in the waveform C of FIG. 4. Actually, any given bit cell period will not vary that much from its immediately preceding bit cell period. In this regard, a data pulse can therefore vary from its mid-cell position by as much as ten percent of a bit cell period without being lost.

It is also to be noted that the variance in the occurrence of a data pulse is also compensated for by the timing pulses $P_3$ through $P_5$ appearing on the line 58 at the output of the timing circuit 46. It will be remembered that these pulses are applied to the shift register 54 via the line 58 as well as to the character recognition circuit 60 via a line 72. The leading edges of the timing pulses $P_3$–$P_5$ do not occur until toward the end of the bit cell period. The leading edges actually do not occur until three-quarters of the previous bit cell periods. These leading edges cause the shift register 54 to shift the stored bits of information including the current bit of information that has now been detected. The shift register 54 continues to shift the detected bits of information upon the occurrence of a leading edge until a full character has been counted by the character recognition circuit 60. This latter event occurs by virtue of the bit counter 74 within the character recognition circuit 60 having counted the number of detected bits up to the predetermined number of bits equal to a character. The bit counter 74 is triggered upon the occurrence of a leading edge of one of the timing pulses $P_3$–$P_5$. When the predetermined number of bits have occurred, the bit counter 74 goes logically high thereby causing the shift register 54 to parallel load the bit contents into the memory 64.

It is to be noted that the timing circuit 46 as well as the character recognition circuit 60 must be initialized before data detection can occur. This is accomplished by an initializing circuit generally indicated within the dotted outline 92 of FIG. 3. The initializing circuit receives the signals from the sensors 18 and 20 over the lines 36 and 38. It will be remembered from the description of FIG. 2 that the sensor 18 is positioned relative to the read head 22 in such a manner as to sense when the credit card 10 has sufficiently advanced underneath the read head 10 so as to avoid any initial noise effects. When this occurs, the signal from the sensor 18 appearing on the line 36 in FIG. 3 goes logically high thereby triggering a one-shot 94. As the credit card 10 proceeds further underneath the read head 22, the leading edge thereof passes to the other side of the read head and subsequently passes underneath the sensor 20. At this time, the sensor 20 produces a logically high signal on the line 38. Referring to the initializing circuit 92, it is seen that both the output of the one-shot 94 as well as the line 38 are connected to an OR-gate 96. The OR-gate 96 will produce a logically high signal at the output thereof when either the one-shot 94 is high or the signal on the line 28 from the sensor 20 is logically high. This constitutes the output of the initializing circuit 92 which is applied to a decrement counter 80 within the timing circuit 46 via a line 98. The logically high signal on the line 98 enables the decrement counter 80. Prior to such enablement, the decrement counter is inoperative and the timing circuit 46 does not produce any timing pulses.

The output of the initializing circuit 92 is also applied to the flip-flop 68 within the character recognition circuit 60 via a line 100. The logically high signal on the line 100 resets the flip-flop 68 within the character recognition circuit 60. This resetting of the flip-flop 68 allows the character recognition circuit to begin the search for the first binary one bit to be sensed by the read head 22. As has been previously noted, when this occurs, the flip-flop 68 becomes set thereby allowing the character recognition circuit to begin its bit count.

The operation of the initializing circuit 92 is further illustrated by the waveforms of FIG. 5. In this regard, it is to be noted that the alphabetically labelled waveforms of FIG. 5 correspond to signals occurring at the alphabetically-labelled locations within the initializing circuit 92 of FIG. 3. The operation of the initializing circuit 92 begins with the sensor 18 going high at a time $t_0$ indicating that the credit card 10 has been inserted into the slot 16. The sensor 18 remains on until the credit card 10 has left sensor 18 at a time $t_1$. At this time, the credit card 10 is sufficiently underneath the read head 22 so as to present recorded information to the data detection circuit 34. At the time $t_1$, the one-shot 94 goes logically high thereby providing a logically high signal at the output of the initializing circuit 96. These conditions are illustrated in the waveforms H and I of FIG. 5. Referring to waveform H, it is seen that the one-shot 94 remains high for a time T. As will become apparent hereinafter, this time T sets the maximum amount of time which the card 10 can take in proceeding towards the sensor 20 after having left the sensor 18. In other words, time T establishes a minimum speed at which the credit card 10 must proceed underneath the read head 22 in order to provide a credible read-out signal to the data detection circuit 30. Referring to the waveform J of FIG. 5, it is seen that the sensor 20 goes logically high at a time $t_2$ thereby indicating that the credit card 10 has proceeded underneath the read head 22 at such a rate as to encounter the sensor 20 prior to the termination of the maximum amount of time T allotted thereto by the one-shot 94.

Provision has been made for alerting the operator when the card 10 has not proceeded underneath the sensor 20 during the time T established by the one-shot 94. This is done by an alarm circuit 102 in FIG. 3. The alarm circuit 102 comprises inverters 104 and 106, a flip-flop 108 and a lamp 110. The operation of the alarm circuit can be understood by referring to the signals H and J of FIG. 5 that are applied thereto.

The signal H from the one-shot 94 is inverted and applied to the clocking input of the J-K flip-flop 108. The inversion of the signal H will be logically low for the time period T and will rise high thereafter. This signal transition at the end of the time T is operative to clock the J-K flip-flop so as to cause its Q output to follow the J input. The J input receives the inversion of the output signal J from the sensor 20. It is to be noted that the K input of the flip-flop 108 receives the output signal J from the sensor 20. This signal application to the K input is merely the mirror reflection of the signal applied to the J input and prevents any toggling action which might otherwise occur.

The inversion of the output signal J is logically high until the card 10 moves thereunder. At such time, the signal goes logically low. If this signal at the J input is still high when the one-shot 94 is timed out, then the Q output of the flip-flop 108 will go high. This will turn on the lamp 110 indicating that the card 10 is not moving at the minimum speed necessary to read the magnetically recorded data. On the other hand, if the card 10 reaches the sensor 20 before the one-shot 94 has timed out, then the inverted output signal of sensor 20 will be low at the J input of flip-flop 108 when it is clocked. This low signal condition is thus clocked into the flip-flop 108 when the one-shot 94 times out and the lamp 110 does not turn on.

Figure 6:
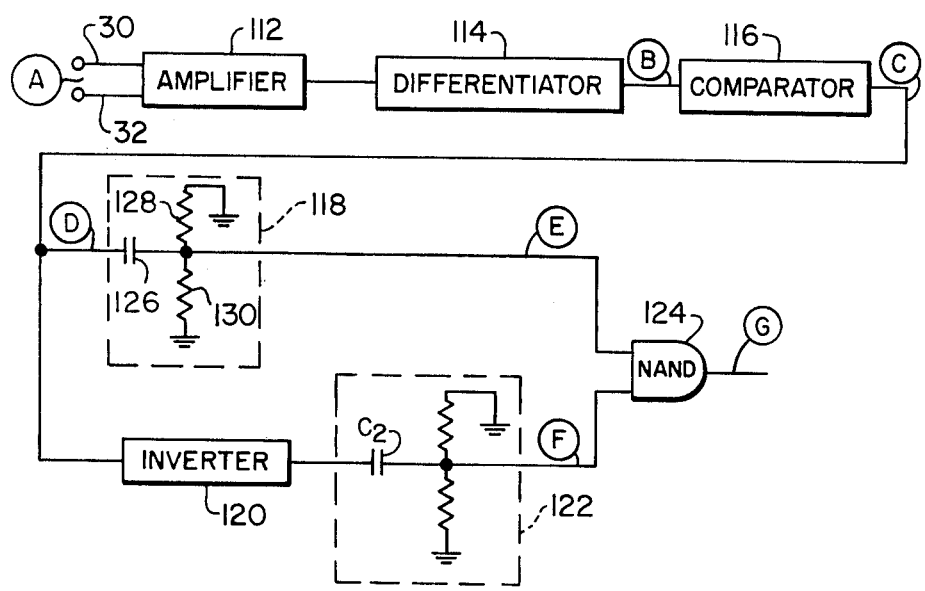
FIG. 6 further illustrates the logic for initially detecting the recorded information.
Figure 7:
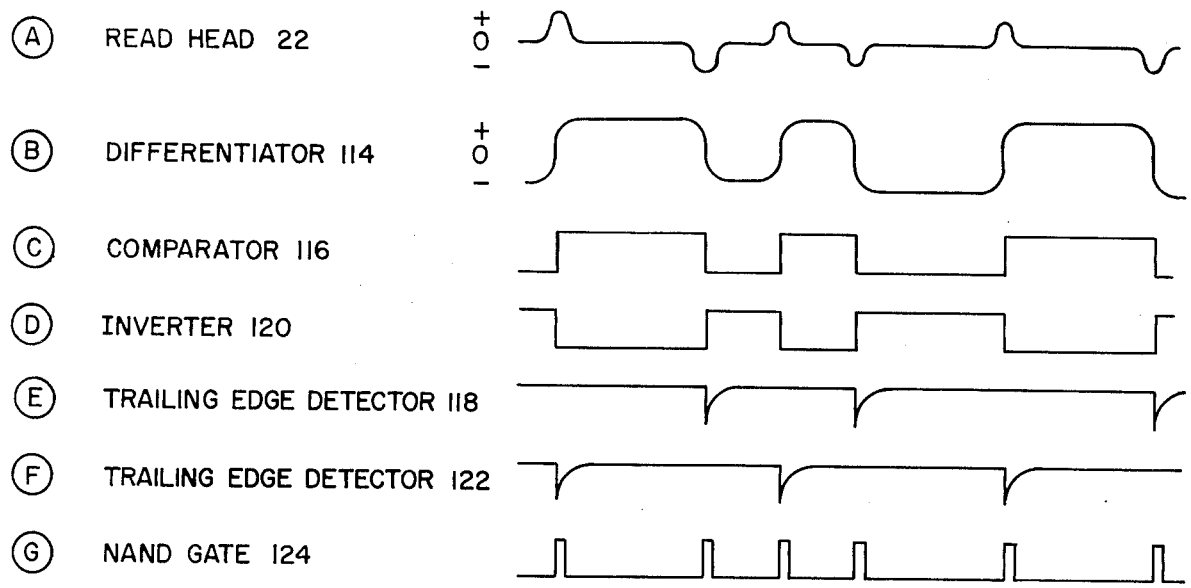
FIG. 7, consisting of A–G, illustrates certain waveforms occurring within the logic of FIG. 6.

Referring now to FIG. 6, the read logic 40 of FIG. 3 is illustrated in further detail. It will be remembered that the read logic 40 receives the signal from the read head 22. The signal from the magnetic read head 22 appears on the lines 30 and 32 and is first applied to an amplifier 112. The output from the amplifier 112 is connected to a differentiator 114 which in turn has an output connected to a comparator 116. The output of the comparator 116 is connected to a first trailing edge detection circuit 118. The output of the comparator 116 is also connected to an inverter 120 which in turn is connected to a second trailing edge detection circuit 122. The outputs of the trailing edge detection circuits 118 and 122 are applied to a NAND gate 124. It is to be understood that each of the elements 112 through 116 represent standard operational amplifiers which can be connected together in the specified manner. It is furthermore to be noted that the trailing edge detection circuits 118 and 122 comprise capacitors such as 126 in the circuit 118 followed by a biased output defined by a set of resistors such as 128 and 130. The internal operation of the read logic circuit of FIG. 6 is clearly illustrated in the waveforms of FIG. 7. The waveforms of FIG. 7 are alphabetically labelled so as to correspond with similarly labeled locations where they occur in the circuitry of FIG. 6. In this regard, the signal from the read head 22 is illustrated as waveform A. This signal is first amplified by the amplifier 112 and thereafter differentiated by the differentiator 114 so as to result in the waveform B of FIG. 7. The waveform B is in turn processed by the comparator 116 which produces a squared waveform C. The squared waveform C is inverted by the inverter 120 so as to produce the inverted squared waveform D. The trailing edges of the squared waveform C and the inverted squared waveform D are detected by negative edge pulse detection circuits 118 and 122 which produce the waveforms E and F. The NAND-gate 124 produces the output waveform G consisting of a series of pulses occurring when the waveforms E and F are not simultaneously high. The resulting pulses at the output of the NAND-gate 124 constitute the output signal of the read logic circuit 40. As can be noted in FIG. 7, these pulses correspond to the negative and positive-going pulses in the waveform A.

From the foregoing, it is to be appreciated that a preferred embodiment has been disclosed of a read apparatus capable of reading magnetically recorded information that is manually processed. The circuitry disclosed in this preferred embodiment is comprised of digital logic elements which are commercially available. It is to be noted that equivalents to these elements may be used without departing from the scope of the present invention.

What is claimed is:

1. Apparatus for processing bits of information recorded on a magnetic medium wherein the magnetic medium is being moved at a variable speed, wherein both the bit cell time period and the time of occurrence of an information bit within the bit cell time period may vary, said apparatus comprising:
    means for reading the bits of recorded information so as to produce a single train of spaced pulses having variable spaces therebetween said pulses corresponding to each magnetic flux reversal sensed;
    timing means, responsive to the train of spaced pulses, for producing a train of first timing pulses and a train of second timing pulses, said first and second timing pulses being operative to define separate portions of variable bit cell lengths of time;
    means for detecting the binary value of successive bits of recorded information, said detecting means being responsive to the train of first timing pulses;
    means, responsive to the second timing pulses, for storing the binary values of the detected bits of recorded information; and
    character recognition means, responsive to the second timing pulses, for counting the detected bits of recorded information, said character recognition means being operative to recognize when a full character of information has been detected.

2. The apparatus of claim 1 wherein said timing means comprises:
    means for selectively gating pulses within the train of spaced pulses from said reading means;

means, responsive to the gated pulses, for incrementally counting at a first frequency the elapsed time occurring between successively gated pulses, said incremental counting means being operative to produce an incremented count of the elapsed time; and means, responsive to the gated pulses, for decrementing at a second frequency, the incremented count previously produces by said incremental counting means.

3. The apparatus of claim 2 wherein said decremental counting means is operative to produce a bi-level signal having a first signal level when the incremented count is being decremented and having a second signal level thereafter.

4. The apparatus of claim 3 wherein the occurrences of the first signal level of the bi-level signal from said decremental counting means define the train of first timing pulses and the occurrences of the second signal level of the bi-level signal define the train of second timing pulses.

5. The apparatus of claim 4 wherein the first timing pulses begin at the beginning of bit cell periods and the second timing pulses terminate at the end of bit cell periods.

6. The apparatus of claim 4 wherein the first frequency, at which the incremental counting occurs is equal to three-fourths of the second frequency, at which the decremental counting occurs.

7. The apparatus of claim 1 wherein the first timing pulses begin at the beginning of bit cell periods and the second timing pulses terminate at the end of bit cell periods.

8. The apparatus of claim 7 wherein the train of spaced pulses from said reading means includes data pulses indicative of a binary value, and wherein said detecting means comprises:
gating means, selectively enabled by the occurrence of a first timing pulse, for gating a data pulse.

9. The apparatus of claim 2 wherein said reading means includes transducing means for sensing the bits of recorded information and said apparatus further comprises:
means for detecting the initial movement of the magnetic media, said initial movement detecting means being operative to generate an initializing signal when the bits of recorded information are underneath said transducing means.

10. The apparatus of claim 9 wherein said decremental counting means is operative to decrementally count in response to the initializing signal.

11. The apparatus of claim 9 wherein said character recognition means comprises:
means, responsive to said initializing signal, for thereafter identifying the first detected bit of the first character.

12. The apparatus of claim 9 wherein said means for producing an initializing signal comprises:
a first sensor, located to one side of said transducing means, for sensing when the magnetic media is no longer thereunder;
a second sensor located to the other side of said transducing means for sensing when the magnetic media moves thereunder; and
means, responsive to said first sensor for generating a pulse having a predetermined pulse width equal to the maximum allotted time in which said magnetic media is to move under said second sensor.

13. The apparatus of claim 12 wherein said means for producing an initializing signal further comprises:
an OR-gate for receiving the bi-level signal from said means responsive to said first sensor and the signal from said second sensor, the output of said OR-gate being the initializing signal.

14. The apparatus of claim 12 further comprising:
alarm circuit means for generating a warning when the pulse having a predetermined pulse width terminates prior to the signal from said second sensor.

15. Apparatus for manually processing bits of information appearing on a card, said apparatus comprising:
means for receiving the card for manual movement therein;
transducing means for sensing the bits of information when the card is manually moved thereunder;
means, connected to said transducing means, for producing a train of spaced pulses when the card is manually moved underneath the transducing means;
means for selectively gating pulses within the train of spaced pulses;
means, responsive to the gated pulses, for incrementally counting at a first frequency, the elapsed time between successively gated pulses, said incremental counting means being operative to produce an incremented count indicative of the elapsed time;
means, responsive to the gated pulses, for decrementing at a second frequency the incremented count previously produced by said incremental counting means, said decrementing means being operative to produce a bi-level signal having a first signal level during such time as the previously produced incremented count is being decremented and having a second signal level thereafter; and
means, responsive to the first signal level of the bi-level signal, for detecting the binary value of successive bits of information.

16. The apparatus of claim 15 wherein said means for selectively gating pulses within the train of spaced pulses is responsive to the occurrence of the second signal level of the bi-level signal produced by said decremental counting means.

17. The apparatus of claim 16 wherein the first frequency at which the incremental counting occurs is equal to three-fourths of the second frequency at which decremental counting occurs.

18. The apparatus of claim 16 wherein the train of spaced pulses includes data pulses indicative of a binary value, and wherein said detecting means comprises:
gating means, selectively enabled by the first signal level of the bi-level signal, for gating a data pulse.

19. The apparatus of claim 15 further comprising:
a first sensor, located to one side of said transducing means, for sensing when the card is no longer thereunder;
a second sensor, located to the other side of said transducing means, for sensing when the card moves thereunder;
means, responsive to said first sensor for generating a pulse having a predetermined pulse width equal to the maximum allotted time in which the card is to move under said second sensor.

20. The apparatus of claim 19 further comprising:
alarm circuit means for generating a warning when the pulse having a predetermined pulse width equal to the maximum allotted time in which the card is to move under said second sensor terminates prior to the signal from said second sensor.

21. The apparatus of claim 19 further comprising:
means, responsive to both the pulse having a predetermined pulse width and the signal from said second sensor, for producing an initializing signal, the initializing signal being operative to initialize the decremental counting means so as to receive an incremented count from said incremental counting means, said decremental counting means being thereafter operative to produce the first signal level of the bi-level signal.

* * * * *